Nov. 23, 1943.  C. F. HILLDRING  2,334,767
METHOD OF MAKING SPIDERS FOR STEERING WHEELS
Filed Oct. 3, 1940
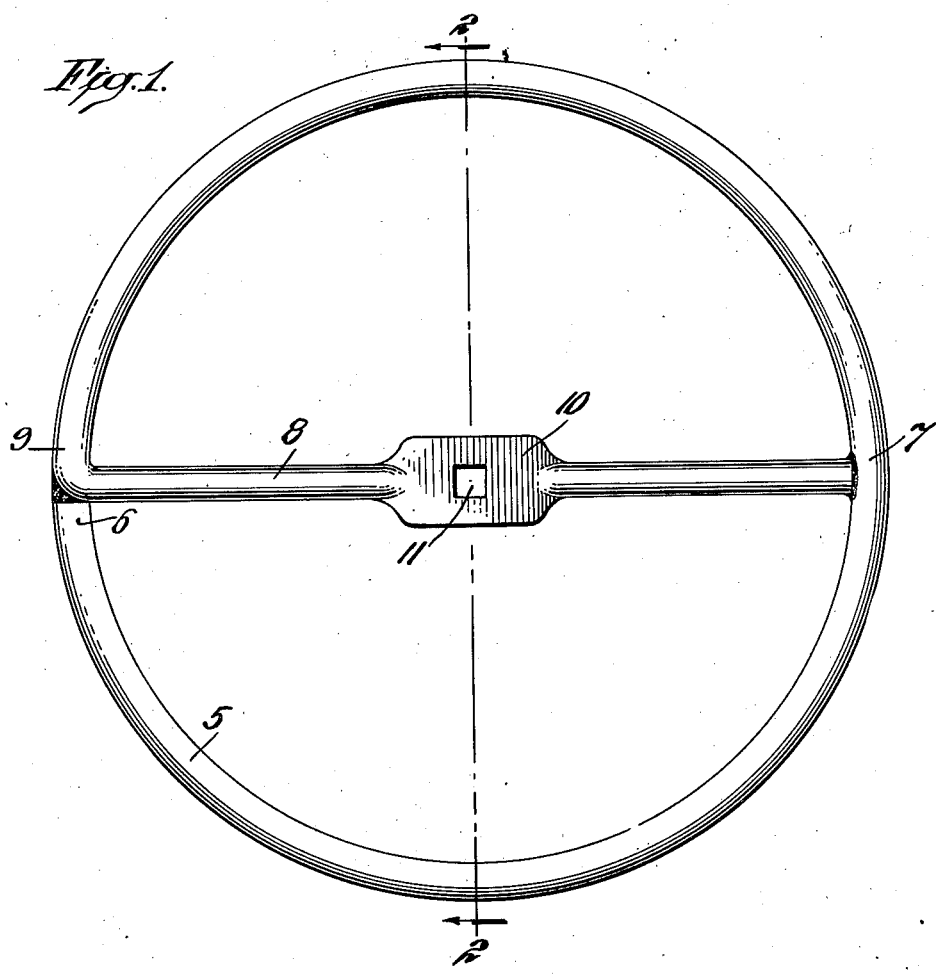
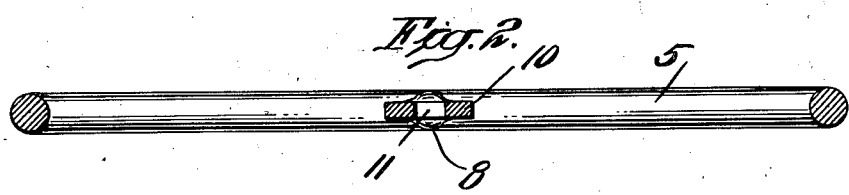
INVENTOR
CARL F. HILLDRING
BY English & Studwell
ATTORNEYS Patented Nov. 23, 1943

2,334,767

UNITED STATES PATENT OFFICE 2,334,767

METHOD OF MAKING SPIDERS FOR STEERING WHEELS

Carl F. Hilldring, Akron, Ohio, assignor to American Hard Rubber Company, New York, N. Y., a corporation of New York Application October 3, 1940, Serial No. 359,463

1 Claim. (Cl. 29—159)

The invention relates to a method of making an improved spider for a steering wheel.

The object of the invention is a method for producing a strong, sturdy, steering wheel suitable for vehicle use more cheaply than such steering wheels have heretofore been produced. Although the improved steering wheel is adapted for use on a large variety of vehicles, including power-driven vehicles, it is particularly adapted to use on children's vehicles, whether self-propelled or otherwise driven.

The improved steering wheel is illustrated in the accompanying drawing in which Fig. 1 is a top plan view of the steering wheel; and Fig. 2 is a transverse section taken on the line 2—2 of Fig. 1.

One way of the novel method of producing the improved steering wheel shown on Fig. 1 consists in bending one end of a straight wire rod (of suitable gauge or diameter) on itself to form a ring or hoop 5 of a diameter requisite to constitute the rim of the proposed steering wheel. At the point where the unbent portion of the wire rod meets or overlaps the first end 6 of the bent portion of the wire, it is bent sharply on itself in the direction toward the opposite side 7 of the ring to constitute a single straight diametrical spoke 8. In the production of the improved steering wheel the length of the wire rod is such that it is just sufficient to form the ring 5 and the double radius spoke 8. In case, however, the end of the length of straight wire bent inwardly from the point 9 on the ring 5 to constitute the spoke 8 overlaps the side 7 of the ring 6, it is cut off flush with the inner surface of the side 7. When the wire rod has been formed into the ring or rim 5 and spoke 8 shape shown in Fig. 1, with the first end 6 of the ring abutting the point 9, and the free end of the spoke 8 abutting the inner surface of the point 7 of the ring, these abutting parts are secured together, as by soldering or brazing.

Before or after the straight wire rod is bent into the shape shown in Fig. 1, one portion of the end of the rod, that which is to constitute the diametrical spoke 8, is flattened, as indicated at 10, to form the hub portion of the spoke and this flattened portion is pierced at 11 for an opening to receive the upper end of the steering post of the vehicle.

Another way of forming the improved steering wheel is to bend the wire at the point 9 leaving the straight end to constitute the spoke 8. The remainder of the rim portion is then bent around until the free end 6 abuts the point 9, after which the free end of the spoke and the free end of the rim are secured to the adjacent portions of the rim. In the practise of this form of the invention also, the hub portion 10 may be flattened and pierced before or after the wheel is formed. When the improved steering wheel has been formed, as shown in Fig. 1, the rim 5 and the two ends of the spoke 8 as far inwardly as the hub 10 may, if preferred, be covered with any suitable substance, such as a plastic—hard rubber or the like—to lend attractiveness to the wheel and to protect the hands of the operator from contact with the metal of which the core of the finished steering wheel is composed.

From the foregoing description it will be understood that the improved steering wheel, as is shown in Fig. 1, formed by the method of the invention is sufficiently strong for the purposes for which it is intended and that it can be produced relatively cheaply.

Having thus described the invention what I claim as new is:

In the method of making a steering wheel with an integral spoke, the steps comprising forming the rim of the wheel by bending a predetermined length of a substantially straight wire rod into a circle which includes in its circumference one end of the rod, making a sharp bend in the rod at the point where the remaining unbent portion of the rod meets the circularly bent portion while directing the unbent portion of the rod across the diameter of the formed circle and the free end of the unbent portion into abutting relationship with the ring diametrically opposite the sharp bend so as to constitute the unbent portion of the rod into a diametrical spoke, uniting with fused metal the free end of the bent portion to the formed diametrical spoke at the sharp bend and within the circumference of the rim and the other end of the diametrical spoke to the rim in its abutting relationship therewith, and completing the steering wheel by forming a hub portion in the diametrical spoke by flattening a length of the mid-portion of the diametrical spoke and piercing the flattened portion at the center of the hub portion to form an opening for receiving the upper end of a steering post, whereby the steering wheel and diametrical spoke is constituted from one continuous length of rod.

CARL F. HILLDRING.